United States Patent
Dienhart et al.

(10) Patent No.: US 6,543,239 B2
(45) Date of Patent: Apr. 8, 2003

(54) AIR-CONDITIONING SYSTEM OPERATED WITH $CO_2$

(75) Inventors: Bernd Dienhart, Köln (DE); Hans-Joachim Krauss, Stuttgart (DE); Hagen Mittelstrass, Bondorf (DE); Karl-Heinz Staffa, Stuttgart (DE); Christoph Walter, Stuttgart (DE); Michael Katzenberger, Brackenheim (DE); Karl Lochmahr, Vaihingen (DE); Werner Strauss, Bietigheim (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/212,431

(22) Filed: Aug. 5, 2002

(65) Prior Publication Data

US 2003/0000235 A1 Jan. 2, 2003

(Under 37 CFR 1.47)

Related U.S. Application Data

(63) Continuation-in-part of application No. 09/528,037, filed on Mar. 17, 2000.

(30) Foreign Application Priority Data

Jul. 20, 1998 (DE) .......................... 198 32 479

(51) Int. Cl.[7] .................. F25B 5/00; F25B 1/00
(52) U.S. Cl. ................. 62/199; 62/498; 62/525
(58) Field of Search ................ 62/511, 513, 113, 62/197, 199, 222, 181, 525, 498

(56) References Cited

U.S. PATENT DOCUMENTS

| 3,285,030 | A | * | 11/1966 | Coyne .................... 62/197 |
| 3,786,651 | A | * | 1/1974 | Eschbaugh et al. .......... 62/222 |
| 5,170,638 | A | * | 12/1992 | Koenig et al. .............. 62/204 |
| 5,245,836 | A | * | 9/1993 | Lorentzen et al. ........... 62/174 |
| 5,385,030 | A | * | 1/1995 | Kitigawa et al. ............ 62/160 |
| 5,685,160 | A | * | 11/1997 | Abersfelder et al. ......... 62/114 |

FOREIGN PATENT DOCUMENTS

EP  0915306 A2 * 5/1999 ............. F25B/9/00

* cited by examiner

Primary Examiner—Denise L. Esquivel
Assistant Examiner—Marc Norman
(74) Attorney, Agent, or Firm—Scott M. Confer

(57) ABSTRACT

An air-conditioning system operated with $CO_2$ for a vehicle has a high-pressure section that is connected to the output of a compressor and includes a gas cooler, a low-pressure section that is connected to the suction side of the compressor and includes an evaporator, and an expansion member connecting the high-pressure section and the low-pressure section. The expansion member has a fixed restrictor with a throttle opening of predetermined length and diameter connected between an inlet from the high-pressure section and an outlet to the low-pressure section whereby under all operating conditions of the system, a pressure of refrigerant in the high-pressure section of the system is limited to values of less than 14 MPa. The restrictor can be connected in parallel with a pressure limiting valve and can include two or more different throttle openings that can be selectively connected for refrigerant flow.

13 Claims, 3 Drawing Sheets

AIR-CONDITIONING SYSTEM OPERATED WITH $CO_2$

CROSS-REFERENCE TO RELATED APPLICATION

This application is a continuation of U.S. patent application Ser. No. 09/528,037, filed Mar. 17, 2000, hereby incorporated herein by reference.

FIELD OF THE INVENTION

The present invention relates to an air-conditioning system that can be operated with $CO_2$ for a vehicle, having a high-pressure section which is connected to the output of a compressor and contains a gas cooler, having a low-pressure section which is connected to the suction side of the compressor and contains an evaporator, and having an expansion member connecting the high-pressure section and the low-pressure section.

BACKGROUND OF THE INVENTION

In order to achieve an optimum cooling performance and an optimum performance figure in air-conditioning systems operated with $CO_2$ (refrigerant R744), the known air-conditioning systems are provided with complicated controllers that control not only the compressor, but also the high pressure by means of an adjustable, expensive expansion valve, for which a high-pressure sensor is also needed. The high-pressure controller is considered to be necessary by those skilled in the art since the required cooling performance, which depends on the temperature of the external environment and on the desired cooling, can be implemented with an optimum performance figure at optimum high pressures associated with these performance figures. By means of the controlled expansion valve, it is desired to operate the air-conditioning system under any operating conditions at the high pressure at which the optimum of the cooling performance and the optimum of the performance figure (COP) is located. This achieves a situation where the air-conditioning systems operated with $CO_2$ are of equal value to or, to some extent are even superior to air-conditioning systems that are operated with other refrigerants, for example the refrigerant R134a. Although the air-conditioning systems operated with $CO_2$ are recognized to be more environmentally friendly than the air-conditioning systems operated with other refrigerants, considerably increased production costs oppose their practical implementation.

SUMMARY OF THE INVENTION

The present invention is based on the object of providing an air-conditioning system of the type described above whose production costs are reduced.

This object is achieved in that the expansion member provided is a fixed restrictor whose throttle opening is matched in terms of length and diameter to the system in such a way that under all operating conditions the pressure in the high-pressure section is limited to values of less than 14 MPa.

Surprisingly, it has been found that an air-conditioning system having a fixed restrictor designed in this way can be operated in the vicinity of the optima of cooling performance and performance figure, so that it is possible to dispense with an expensive expansion valve and its control. As a result, a considerable reduction in price can be implemented without noticeable penalties in relation to cooling performance and performance figure having to be tolerated.

In a further refinement of the invention, a pressure limiting valve connected in parallel with the fixed restrictor is provided. The pressure limiting valve ensures that the maximum pressure occurring is limited to a value which lies somewhat above the pressure value set by the fixed restrictor, for example at 16 MPa. In an advantageous embodiment, provision is made for the pressure limiting valve and the fixed restrictor to be designed as one structural unit. This permits a relatively simple and correspondingly cost-effective expansion member to be provided.

In a further refinement of the invention, provision is made for the fixed restrictor to contain a switchable throttling element having at least two different throttle openings. The switchable throttling element may be adjusted, for example, as a function of the pressure and/or the temperature, so that in each case use is made of a suitable throttle opening having a predefined throttle cross section. It is therefore possible, by means of a simple controller to improve the air-conditioning system a little further in relation to the optima of cooling performance and performance figure. The same effect may be achieved if provision is made for two or more fixed restrictors connected in parallel which can be brought into use by means of an associated valve.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

DESCRIPTION OF THE PREFERRED EMBODIMENT $CO_2$ (carbon dioxide) has a relatively low critical temperature (31.1° C.), so that an air-conditioning system operated with $CO_2$ necessitates a process management which is modified by comparison with air-conditioning systems operated with other refrigerants, even when at first glance the air-conditioning system as such appears to be constructed very similarly. As shown in FIG. 1, an air-conditioning system contains a controllable compressor 10. The control of the compressor 10 is carried out by switching on and off, or by an internal controller or by an external adjustment of the compressor stroke. The compressor should have an isentropic efficiency of at least 0.6 and a volumetric efficiency of at least 0.6. An output of the compressor 10 is connected to a high-pressure section, which contains a gas cooler 11. This gas cooler 11 is configured such that it has a thermal efficacy of at least 0.7. The high-pressure section also contains an internal heat exchanger 12 that receives the refrigerant from the gas cooler 11, and having a first output from which the refrigerant passes to an expansion member 13. In order to obtain effective operation of the air-conditioning system, high pressures up to 12 MPa and, if appropriate, up to 14 MPa are necessary in the high-pressure section.

Figure 1:
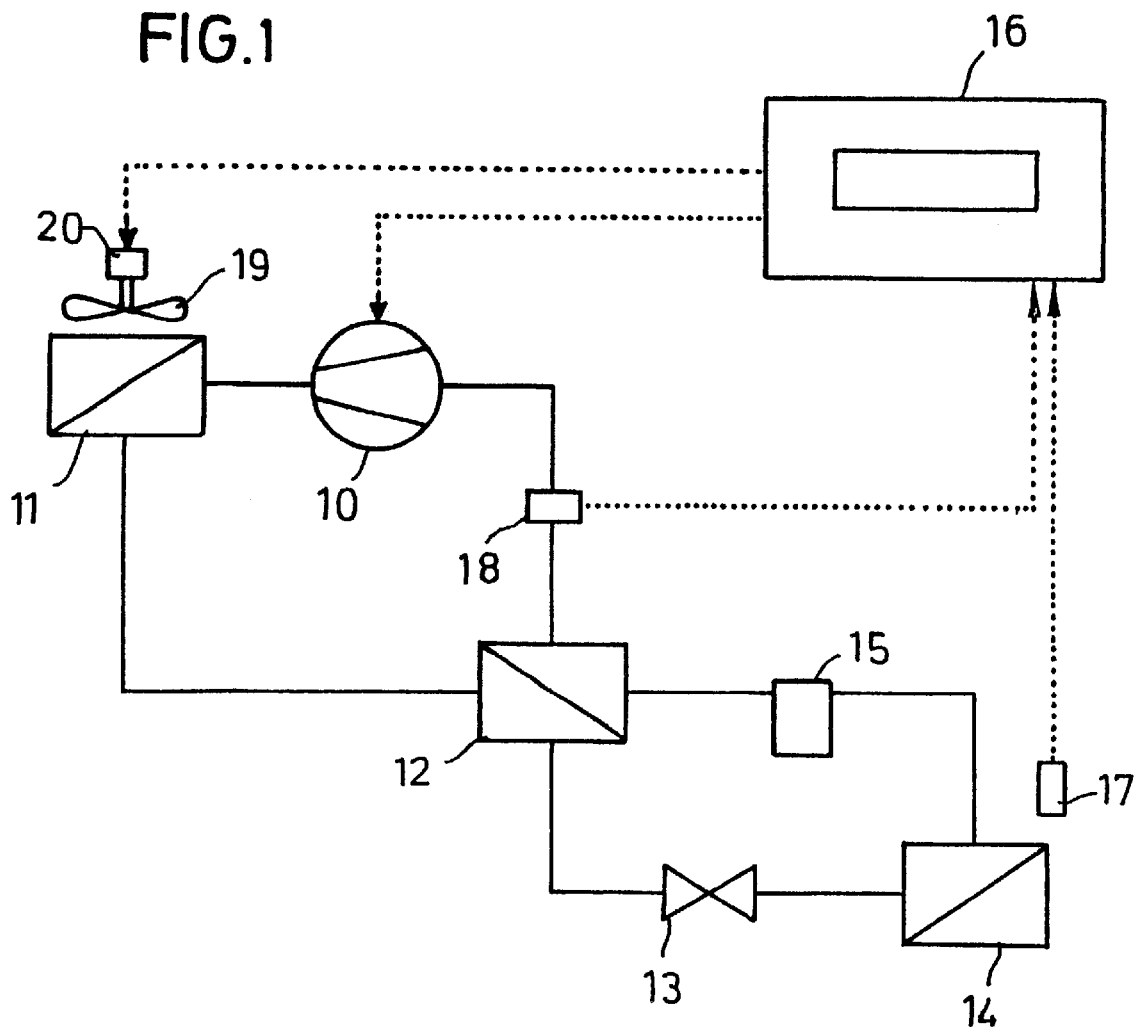
FIG. 1 is a schematic diagram of an air-conditioning system according to the present invention having an expansion member designed as a fixed restrictor.

By means of the expansion member 13, the refrigerant is expanded to pressures between 3.5 MPa and 5 MPa and then passes into a low-pressure section. This low-pressure section contains an evaporator 14 that is connected via an accumulator 15 and the internal heat exchanger 12 to a suction side of the compressor 10. The evaporator 14 has a thermal efficacy of at least 0.7. The accumulator has a volume of more than 40 cm$^3$. The internal heat exchanger 12, through whose first branch the refrigerant under high pressure flows and through whose second branch expanded refrigerant flows, has a thermal efficacy of at least 0.4. The lines that connect the individual elements to one another have an internal diameter of 2 mm to about 8 mm in the high-pressure section. The lines of the low-pressure section have a greater internal diameter, that is to say an internal diameter of about 3 mm to 10 mm.

The circuit of the air-conditioning system is controlled by means of an electronic control unit 16, into which a sensor 17 inputs the temperature of the output air that has flowed through the evaporator 14. Furthermore, a pressure sensor 18 is arranged in the low-pressure line between the internal heat exchanger 12 and the suction connection of the compressor 10, such sensor registering the level of the suction pressure and passing it on to the control unit 16. On the basis of these sensed values and of inputs of the ambient temperature and the desired cooling, control of the circuit is carried out by controlling the compressor 10.

The expansion member 13 is a fixed restrictor that has a throttle opening with a predefined cross section and predetermined length. The length of the throttle opening and the cross section of the throttle opening are matched to the system in such a way that the maximum high pressure occurring under all operating conditions is limited to a maximum of 14 MPa in the high-pressure section.

It has been found that, using a fixed restrictor designed in this way, it is possible to operate the air-conditioning system in the region of the optima for cooling performance and performance figure, which is completely adequate for the practical operation of an air-conditioning system for a motor vehicle. It is therefore sufficient for this air-conditioning system if only the compressor 10 is controlled, so that a significant saving in costs is achieved.

The throttling action of the expansion member 13 designed as a fixed restrictor is determined by the length and the cross section of the throttle opening. For an air-conditioning system having an output of about 7 kW, a throttle opening with a length of about 10 mm and a cross section of about 1.0 mm is suitable. At higher outputs, the length and/or the cross section of the throttle opening must be adapted appropriately. This adaptation can be carried out empirically by means of trials following a rough calculation.

The gas cooler 11 of the air-conditioning system according to FIG. 1 is provided with a blower 19 that, for example, is driven by an electric motor 20 that can be operated in a number of output stages from the control unit 16. To a restricted extent, adjustment or control of the high pressure is possible by means of appropriately changing the output of the blower 19 and/or the flow delivered by the blower 19 through the gas cooler 11.

Figure 2:
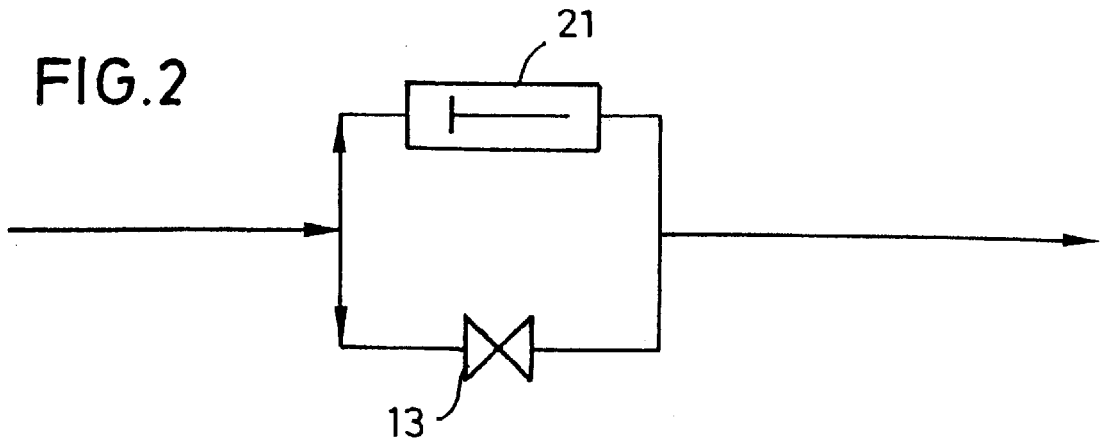
FIG. 2 is schematic diagram of an alternate embodiment expansion member having a fixed restrictor and a parallel-connected pressure limiting valve.

In the alternate embodiment according to FIG. 2, a pressure limiting valve 21, which limits the maximum pressure of the high-pressure section, is connected in parallel with the expansion member 13 designed as a fixed restrictor. The pressure limiting valve 21 is designed such that it opens at such pressures that lie somewhat above the pressures to which the expansion member 13 designed as a fixed restrictor limits the high pressure. For example an opening pressure of 16 MPa is provided for the pressure limiting valve 21.

Figure 3:
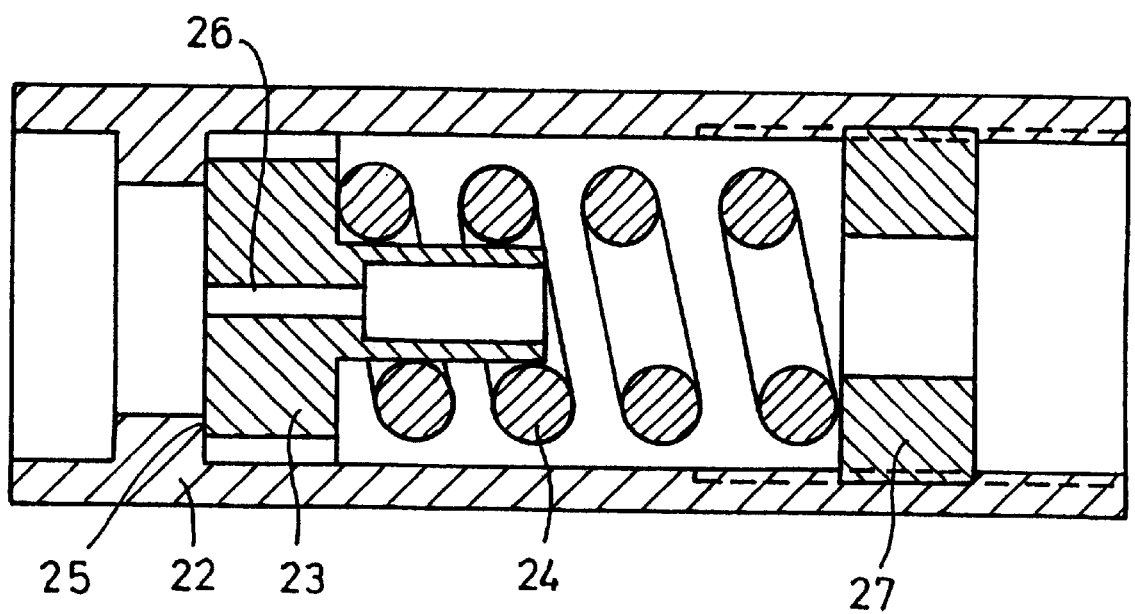
FIG. 3 is a cross section of the fixed restrictor and pressure limiting valve shown in FIG. 2 combined as an integral unit.

As is illustrated in FIG. 3, the expansion member 13 designed as a fixed restrictor may be combined in a simple way with the pressure limiting valve 21 to form one integral structural unit. An axially displaceable throttling member 23 is arranged in a housing 22 and is pressed against a seat 25 by means of a compression spring 24. The throttling member 23 is provided with a throttle opening 26 whose cross section and length are designed such that the high pressure occurring under all operating conditions is less than 14 MPa. The compression spring 24 is biased or prestressed, by means of a setting screw or setting nut 27, such that as soon as an increased high pressure occurs, the throttling member 23 lifts off the seat 25 and opens a correspondingly large cross section and therefore limits the pressure.

Figure 4:
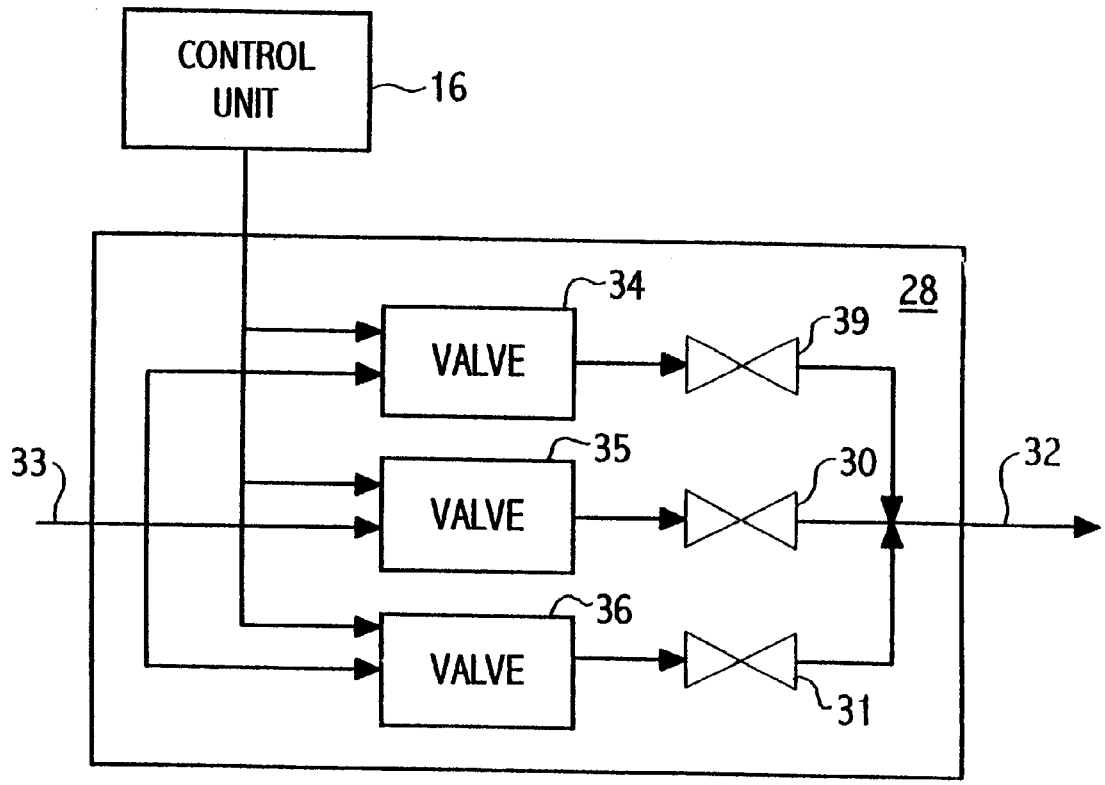
FIG. 4 is a schematic diagram of a second alternate embodiment expansion member.

In a second alternate embodiment shown in FIG. 4, an expansion member 28 contains a switchable throttling element, which is provided with a number of throttle openings that can each be brought alternatively into use, and are designed for different high pressures. For example, three throttle openings 29, 30 and 31 are shown each having an outlet connected to an outlet 32 of the expansion member 28. Although three throttle openings are shown, two or four or more can be provided as desired. An inlet 33 to the expansion member 28 is connected to an inlet of each of three valves 34, 35 and 36 respectively having an outlet connected to an inlet of an associated one of the throttle openings 29, 30 and 31. The action of switching over the throttling element to the respectively suitable throttle opening 29, 30 or 31 is controlled by means of the controller 16 connected to the valves 34, 35 and 36, by which means different high-pressure ranges can be predefined. This action of switching over to one of the throttle openings is carried out on the basis of the pressure in the high-pressure section or else in the low-pressure section and/or the ambient temperature. In this way, it is possible to perform a certain degree of adaptation of the high pressure in the high-pressure section to the ambient temperature without complicated control of the throttle cross sections by means of an expansion valve, in order in this way to improve the cooling performance and the performance figure.

Figure 5:
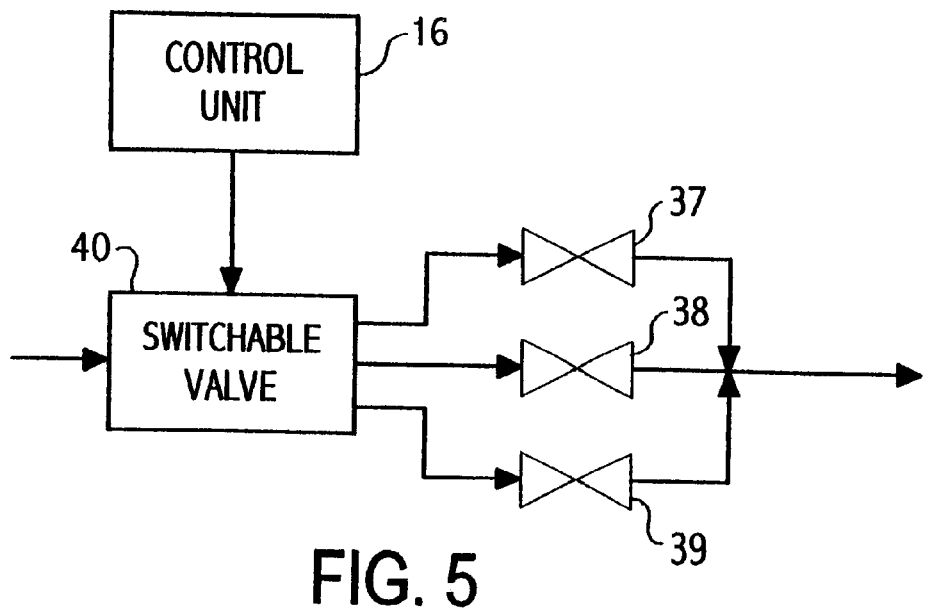
FIG. 5 is a schematic diagram of a third alternate embodiment expansion member.

In another alternate embodiment shown in FIG. 5, two or more fixed restrictors 37, 38, 39, which, for example, are combined with a pressure limiting valve 21 in accordance with FIG. 3, are connected in parallel. Each of the fixed restrictors 37, 38 and 39 is preferably provided with a different throttle opening, these being designed for different high pressures. These fixed restrictors are assigned one or more shut-off valves, that can be actuated by the control unit 16 in such a way that in each case one or more of the fixed restrictors is activated and opened, which define a high-pressure range which is suitable for the required cooling performance with an approximately optimum performance figure. As shown, a switchable valve 40 has a single inlet with multiple outlets each connected to an inlet of one of the restrictors 37, 38 and 39 such that the control unit 16 determines to which of the valve outlets the flow through the valve will be directed. Of course, the valve 40 could be three individual valves each associated with one of the restrictors similar to the construction shown in FIG. 4.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. In an air-conditioning system for a vehicle, the air-conditioning system capable of being operated with $CO_2$, the system having a high-pressure section that is connected to an output of a compressor and includes a gas cooler, a low-pressure section that is connected to a suction side of the compressor and includes an evaporator, and an expansion member connecting the high-pressure section to the low-pressure section, the expansion member comprising:

at least two fixed restrictors connected in parallel with control means for selectively directing refrigerant through said fixed restrictors, each of said fixed restrictors having a throttle opening of predetermined length and diameter connected between an inlet from the high-pressure section and an outlet to the low-pressure section, whereby under all operating conditions of the system a pressure of refrigerant in the high-pressure section of the system is limited to a predetermined value.

2. The air-conditioning system according to claim 1 including at least one pressure limiting valve connected in parallel with at least one of said fixed restrictors.

3. The air-conditioning system according to claim 2 wherein said at least one pressure limiting valve and said at least one fixed restrictor are constructed as an integral structural unit.

4. The air-conditioning system according to claim 1 wherein the control means includes a switchable valve and said fixed restrictors are connected to separate outlets of the switchable valve for mutually exclusive flow of refrigerant through said fixed restrictors.

5. The air-conditioning system according to claim 1 wherein the control means includes at least two valves and said fixed restrictors are each connected to an outlet of an associated one of the valves for mutually exclusive flow of refrigerant through said fixed restrictors.

6. An air-conditioning system for a vehicle, the air-conditioning system capable of being operated with $CO_2$, the air-conditioning system comprising:

a compressor;

a high-pressure section connected to an output of said compressor and including a gas cooler;

a low-pressure section connected to a suction side of said compressor and including an evaporator; and an expansion member connecting said high-pressure section to said low-pressure section, said expansion member including a plurality of fixed restrictors connected in parallel with control means for selectively directing refrigerant through the fixed restrictors, each of the fixed restrictors having a throttle opening of predetermined length and diameter connected between an inlet from said high-pressure section and an outlet to said low-pressure section whereby under all operating conditions of the system, a pressure of refrigerant in said high-pressure section of the system is limited to a predetermined value.

7. The air-conditioning system according to claim 6 including at least one pressure limiting valve connected in parallel with at least one of the fixed restrictors.

8. The air-conditioning system according to claim 7 wherein said at least one pressure limiting valve and the at least one fixed restrictor are constructed as an integral structural unit.

9. The air-conditioning system according to claim 6 wherein the control means includes a switchable valve and the fixed restrictors are connected to separate outlets of the switchable valve for mutually exclusive flow of refrigerant through the fixed restrictors.

10. The air-conditioning system according to claim 6 wherein the control means includes a plurality of valves and each of the fixed restrictors is connected to an outlet of an associated one of the valves for mutually exclusive flow of refrigerant through the fixed restrictors.

11. The air-conditioning system according to claim 6 wherein the gas cooler is provided with a blower having at least two output stages of operation for changing a pressure of refrigerant in said high-pressure section.

12. In an air-conditioning system for a vehicle, the air-conditioning system capable of being operated with $CO_2$, the system having a high-pressure section that is connected to an output of a compressor and includes a gas cooler, a low-pressure section that is connected to a suction side of the compressor and includes an evaporator, and an expansion member connecting the high-pressure section to the low-pressure section, the expansion member comprising:

a fixed restrictor including at least two different throttle openings and valve means for selectively directing refrigerant flow to said throttle openings, said throttle openings having a predetermined length and a diameter and being connected between an inlet from the high-pressure section and an outlet to the low-pressure section whereby under all operating conditions of the system, a pressure of refrigerant in the high-pressure section of the system is limited to a predetermined value.

13. An air-conditioning system for a vehicle, the air-conditioning system capable of being operated with $CO_2$, the air-conditioning system comprising:

a compressor;

a high-pressure section connected to an output of said compressor and including a gas cooler;

a low-pressure section connected to a suction side of said compressor and including an evaporator; and an expansion member connecting said high-pressure section to said low-pressure section, said expansion member including a fixed restrictor including at least two different throttle openings and valve means for selectively directing refrigerant flow to the throttle openings, the throttle openings having a predetermined length and a diameter and being connected between an inlet from said high-pressure section and an outlet to said low-pressure section whereby under all operating conditions of the system, a pressure of refrigerant in said high-pressure section of the system is limited to a predetermined value.

* * * * *